Patented Mar. 10, 1925.

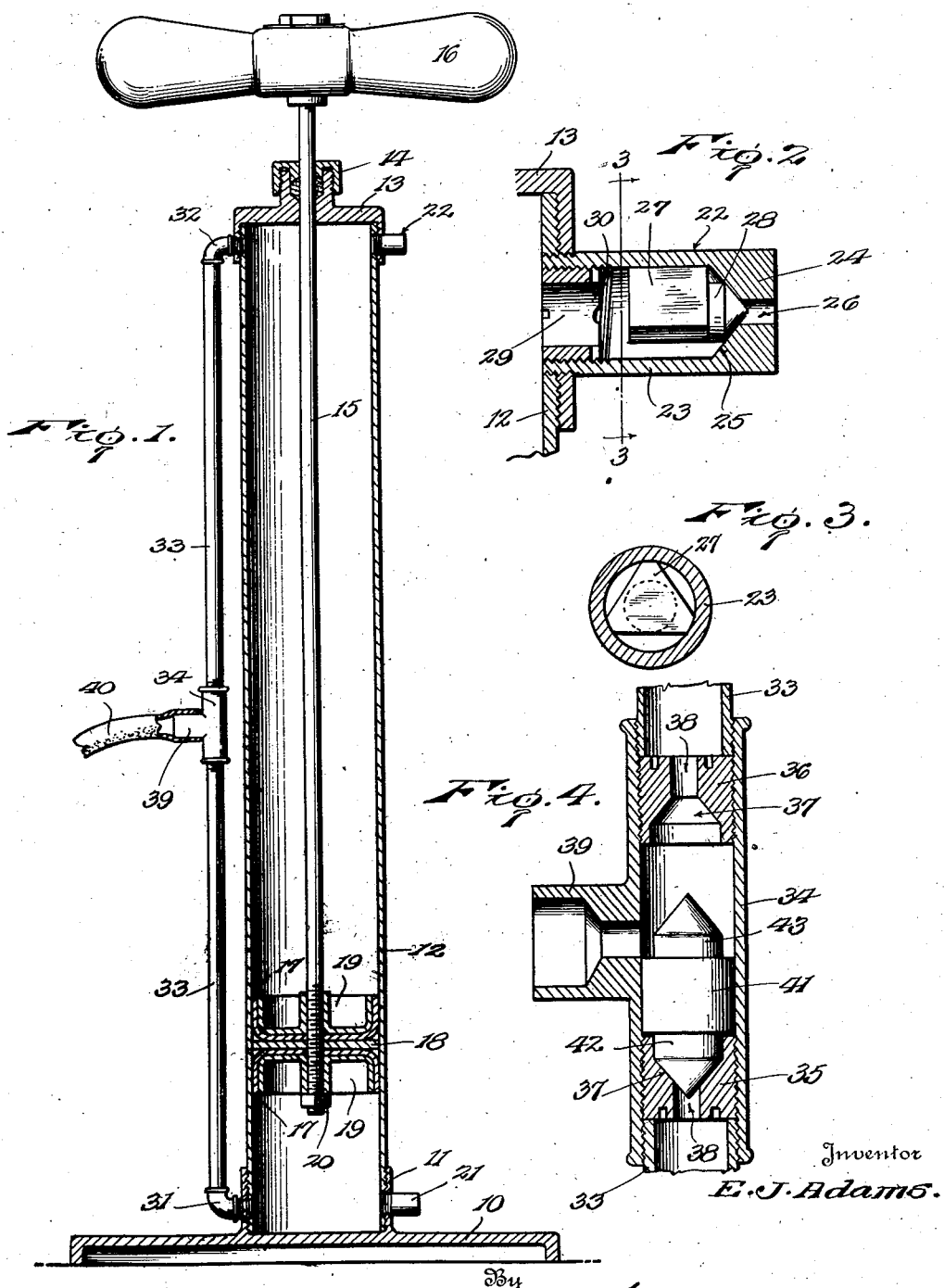

1,529,384

UNITED STATES PATENT OFFICE.

ERNEST J. ADAMS, OF DETROIT, MICHIGAN.

TIRE PUMP.

Application filed May 9, 1922. Serial No. 559,557.

*To all whom it may concern:*

Be it known that I, ERNEST J. ADAMS, a citizen of the United States, residing at Detroit, in the county of Wayne and State of Michigan, have invented certain new and useful Improvements in Tire Pumps, of which the following is a specification.

This invention relates to an improved tire pump and seeks to provide a pump employing separate valves for admitting air at opposite sides of the piston but wherein a single valve will control the discharge of air.

Other and incidental objects will appear hereinafter.

In the drawing:

Figure 1 is a vertical sectional view through my improved pump,

Figure 2 is a fragmentary sectional view showing one of the intake valves,

Figure 3 is a sectional view on the line 3—3 of Figure 2, and

Figure 4 is a fragmentary sectional view showing the discharge valve.

In carrying the invention into effect, I employ a base 10 having a flange 11 into which is threaded a cylinder 12. Threaded upon the cylinder is a cap 13 having a gland 14 and slidable through said gland and through the cap is a piston rod 15 carrying a handle 16. Mounted upon the rod is a piston including spaced leathers 17, a washer 18 and oppositely disposed spreaders 19. A nut 20 locks the parts of the piston on the rod.

Threaded through the flange 11 is an intake valve 21 and threaded through the flange of the cap is a companion intake valve 22. These valves are identical in construction and each includes a valve casing 23 and provided with an end wall 24 in which is formed a conical valve seat 25. Leading through said seat is an inlet passage 26 and mounted within the casing is a check valve 27. Extending from the valve is a valve point 28 adapted to seat flat against the seat 25 and threaded into the casing is a stop ring 29. This ring is notched to define spaced lugs 30.

Threaded through the flange 11 and through the cylinder is an elbow 31 and threaded through the flange of the cap 13 and through the cylinder wall is a similar elbow 32. Extending between the elbows 31 and 32 is a discharge pipe 33 and interposed in said pipe, preferably at a point medially thereof, is the discharge valve of the pump controlling flow of air through the pipe. As shown in detail in Figure 4, the discharge valve includes a cylindrical casing 34 internally threaded at its ends to receive the adjacent ends of the sections of the pipe 33 as well as to accommodate companion plugs which, for convenience, have been indicated at 35 and 36 respectively. These plugs are formed at their inner ends with conical valve seats 37 and entering through the plugs at the apices of said seats are passages 38. At one side the valve casing is formed with a lateral discharge nipple 39 to which may be connected a flexible hose as conventionally illustrated at 40, and mounted within the casing between the plugs 35 and 36 is a discharge valve 41. This valve is formed with a cylindrical body snugly but slidably fitting in the casing for centering the valve, and projecting from the valve body at its ends are companion valve points which, for convenience, have been indicated at 42 and 43 respectively. The valve point 42 is, as shown, adapted to seat flat against the seat 37 closing the passage 38 of the plug 35 while the valve point 43 is adapted to seat flat against the seat 37 closing the passage 38 of the plug 36, the plugs being adjustable for varying the throw of the valve. Thus, wear upon the valve seats may be readily taken up while loss of air through too great a movement of the valve may be prevented.

When the piston moves upwardly the valve 21 will be opened while the valve 22 will be closed so that air will be drawn into the cylinder below the piston while air within the cylinder above the piston will be forced into the pipe 33 at its upper end for closing the valve 41 against the plug 35. Consequently, the air will be discharged through the nipple 39. On the other hand, when the piston is moved downwardly, the valve 21 will be closed while the valve 22 will be opened so that air will be drawn in above the piston while air below the piston will be forced into the pipe 33 at its lower end for closing the valve 41 against the plug 36. Accordingly, the air, as in the first instance, will be discharged through the nipple 39.

Having thus described the invention, what is claimed as new is:

In an air pump, the combination of a T-coupling forming a valve casing, pipes screwed into the casing from opposite ends thereof, plugs also threaded into said ends in advance of the pipes and provided at their inner ends with cylindrical chambers terminating in conical valve seats, restricted passages connecting the seats with the pipes, and a valve having a cylindrical body snugly but slidably fitting in the casing and provided with cylindrical end portions of diameter less than that of said cylindrical body, said end portions being adapted to be snugly received in said chambers and terminating in conical tips to fit said seats, said plugs being adjustable in axial direction for varying the distance between them and the throw of the valve.

In testimony whereof I affix my signature.

ERNEST J. ADAMS. [L. S.]